United States Patent
Lin

(10) Patent No.: US 6,813,997 B1
(45) Date of Patent: Nov. 9, 2004

(54) FRUIT AND VEGETABLE PROCESSOR

(76) Inventor: Kuan-Chih Lin, PMB#1008, 1867 Ygnacio Valley Rd., Walnut Creek, CA (US) 94598

(*) Notice: Subject to any disclaimer, the term of this patent is extended or adjusted under 35 U.S.C. 154(b) by 0 days.

(21) Appl. No.: 10/744,012

(22) Filed: Dec. 24, 2003

(51) Int. Cl.[7] ............................. A23L 1/00; A23N 1/00; A23N 1/02; A47J 43/046; A47J 43/07
(52) U.S. Cl. ............................. 99/511; 99/492; 99/513
(58) Field of Search ................... 99/348, 492, 509–513, 99/485, 495; 366/205, 206, 96–98, 197, 199, 314, 315, 342, 343; 241/282.1, 282.2, 282.5, 292.1, 199.12, 37.5, 92, 285.1, 285.2; 426/518, 519; 403/206, 300

(56) References Cited

U.S. PATENT DOCUMENTS

| | | | | |
|---|---|---|---|---|
| 5,257,575 A | * | 11/1993 | Harrison et al. | 99/511 |
| 5,355,784 A | * | 10/1994 | Franklin et al. | 99/492 |
| 5,421,248 A | * | 6/1995 | Hsu | 99/512 |
| 6,510,784 B1 | * | 1/2003 | Fevre et al. | 99/492 |
| 6,543,340 B1 | * | 4/2003 | Fouquet | 99/511 |

* cited by examiner

Primary Examiner—Timothy F. Simone
(74) Attorney, Agent, or Firm—Leong C. Lei

(57) ABSTRACT

A fruit and vegetable processor is disclosed. The processor comprises a machine body, a top cover, a hollow feeding cylinder and a pushing component, characterized in that the feeding cylinder of the top cover is mounted with a feeding tube, and the feeding tube has a feeding hole, and the circumferential edge of the feeding hole is protruded with an engaging end so that the feeding hole has irregular shape of smaller internal diameter and the rod body of the pressing component and the feeding hole are of same shape.

1 Claim, 8 Drawing Sheets

FRUIT AND VEGETABLE PROCESSOR

BACKGROUND OF THE INVENTION (a) Technical Field of the Invention

The present invention relates to a fruit and vegetable processor, and in particular, to an improved structure of a fruit and vegetable processor which can process or crush fruit or vegetables, and which has a smaller external diameter for vegetables in strips.

(b) Description of the Prior Art

Nowadays, it is very common that fruit and vegetables are crushed into juice for drinking. In view of various types of vegetables and fruit, those with a hard texture require longer processing time or a larger crushing force in order to extract juice from the fruit and vegetable. FIG. 1 is an exploded perspective view of a conventional fruit and vegetable processor 1 comprising a pushing element 11, a top cover 12, a disc blade 13, a machine body 14 and a residue container 15. The pushing element 11 is a cylindrical body having a larger end head, and having a long slot 111 at one side. The lower side end of the long slot 111 has a conic-shaped opening and the top cover 12 is a circular base body 121 having a feeding cylinder 122. The internal diameter of the feeding cylinder 122 is equivalent to that of the cylinder body of the pushing element 11. The inner wall of the feeding cylinder 122 is an engaging body 123 having a protruded bottom end. The engaging body 123 is corresponding to the long slot 11 of the pushing element 11 so that the pushing element 11 is extended into the feeding cylinder 122, the engaging body 123 is engaged at the long slot 11 and the pushing element 11 will not rotate. One side of the base body 121 is extended to form a side cover 124, and the two corresponding sides of the base body 121 are provided with a positioning plate 125. The positioning plate 125 is provided with a depressed engaging slot 126. Further, the disc blade 13 is a conic disc body and the bottom side face is provided with a flat blade 131. The circumferential edge of the flat blade 131 is provided with a plurality of toothed blade 132, and the circumferential edge is a filter 133.

In addition, the machine body 14 has a base seat 141 having a motor (not shown) within the interior of the base seat 141. The top portion of the base seat 141 is a holding seat 142 having a shaft seat 143 at the center driven by the motor. One side of the holding seat 142 has a residue outlet 144 and the other side is provided with a guiding tube 145. At the same time, the center of the base seat 141 is pivotally mounted with a positioning fastener 146 which can swing freely. A residue container 15 is engaged at the side of the residue outlet 144 of the machine body 14.

In combination, the disc blade 13 is engaged at the shaft seat 143 of the machine body 14 for positioning. The top cover 12 is mounted on the holding seat 142 of the machine body 14 and the positioning fastener 146 is rotated upward so that the fastener is positioned at the engaging hole 126 of the positioning plate 125, and the top cover 12 is then positioned. In application, as shown in FIGS. 2 and 3, the motor is switched on to operate and the shaft seat 143 drives the disc blade 13 to rotate simultaneously. Next, if vegetables and fruit 2 are placed into the feeding cylinder 122, and the pushing component 11 is inserted to press the vegetables and fruit 2, so that the fruit and vegetables will not move freely and the toothed blade 132 at the base of the disc blade 13 to crush the vegetable and fruit 2 into juice, and the filter 132 is used for filtering the juice, so that the purified juice flows down from the guiding tube 145. The bottom of the guiding tube 145 is a container to collect the juice and the residue is thrown to the residing container 15.

The drawbacks of the conventional device are that small sized vegetables and fruit cannot be positioned by the pushing component 11 which affect the efficiency of crushing. If a larger top cover 12 is required, a larger machine has to be used and therefore, the cost of production is increased. Accordingly, it is an object of the present invention to provide a fruit and vegetable processor, which mitigates the above drawbacks.

SUMMARY OF THE INVENTION

It is an object of the present invention to provide a vegetable and fruit processor, wherein the feeding cylinder above the top cover has a feeding tube, and the feeding tube has a smaller hole diameter and the middle of one side is protruded so that smaller sized vegetables or fruit strips are placed in the processor, it provides a positioning effect so that the vegetable and fruit in strips will not rotate simultaneously with the blade in the course of cutting.

Yet another object of the present invention is to provide a fruit and vegetable processor, wherein bottom side of the circular body of the side end of the feeding tube is extended to form an engaging block and the internal wall of the upper side end of the feeding cylinder is provided with a corresponding engaging slot.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
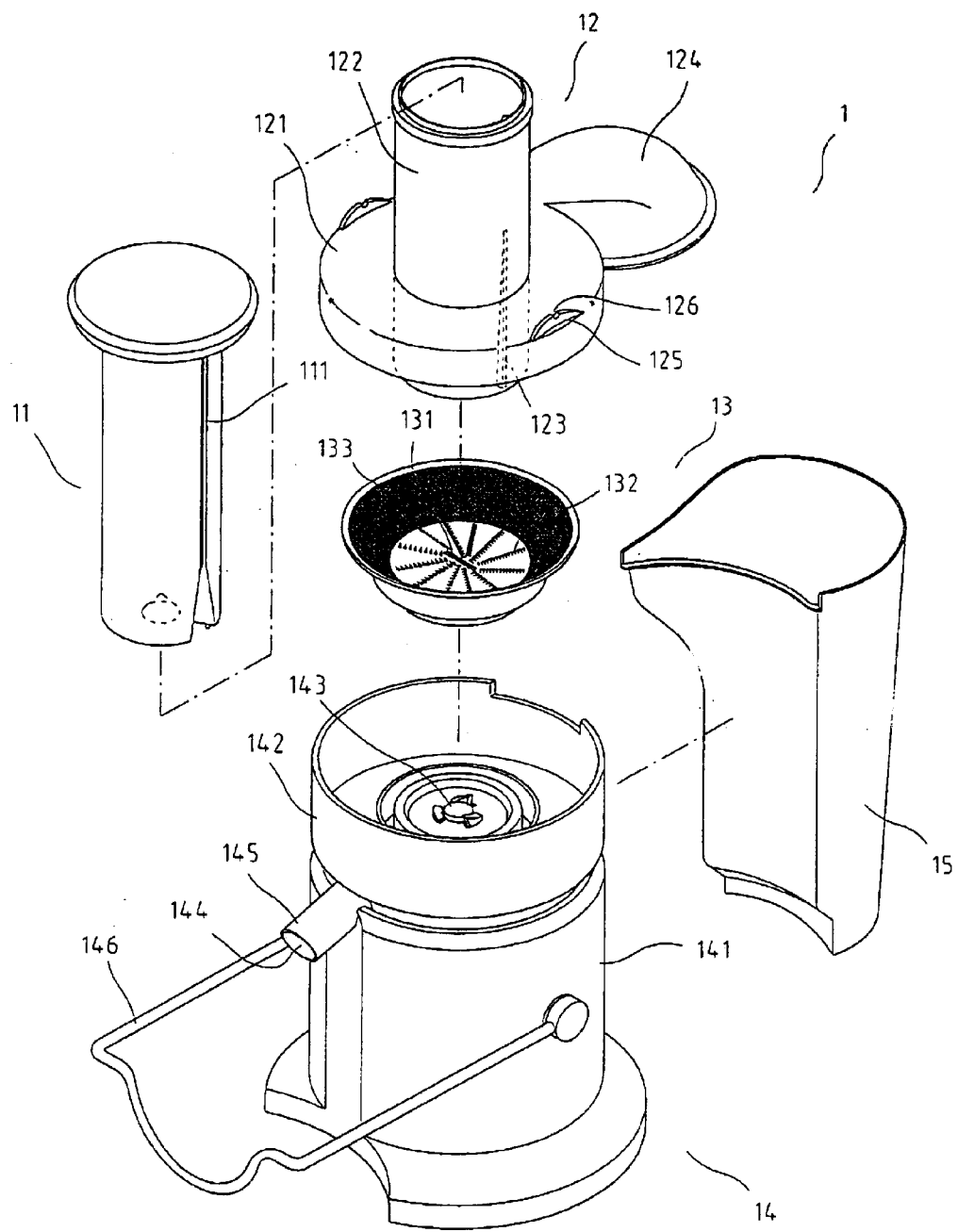
FIG. 1 is a perspective exploded view of a conventional vegetable and fruit processor.
Figure 2:
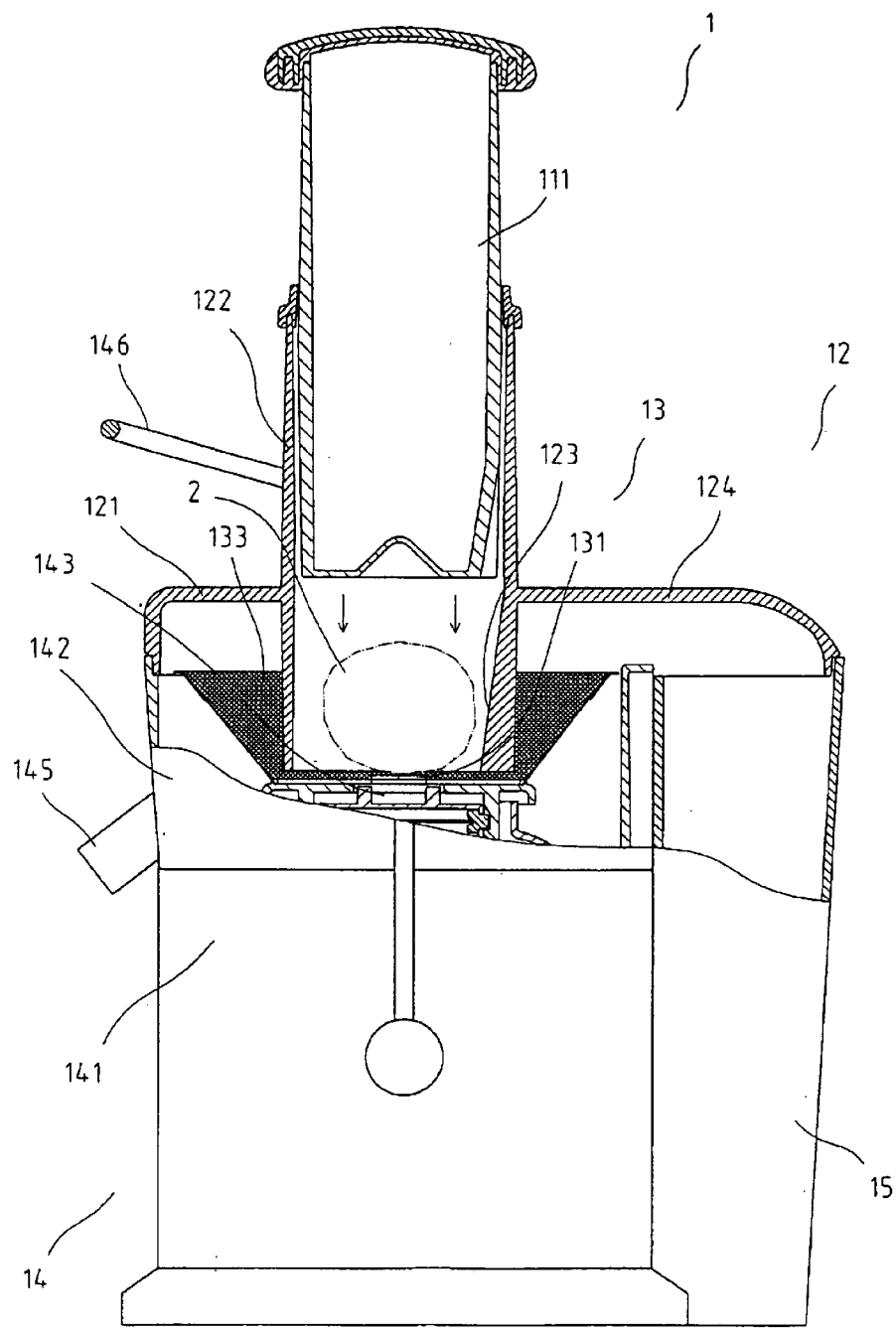
FIG. 2 is a sectional view of a conventional vegetable and fruit processor.
Figure 3:
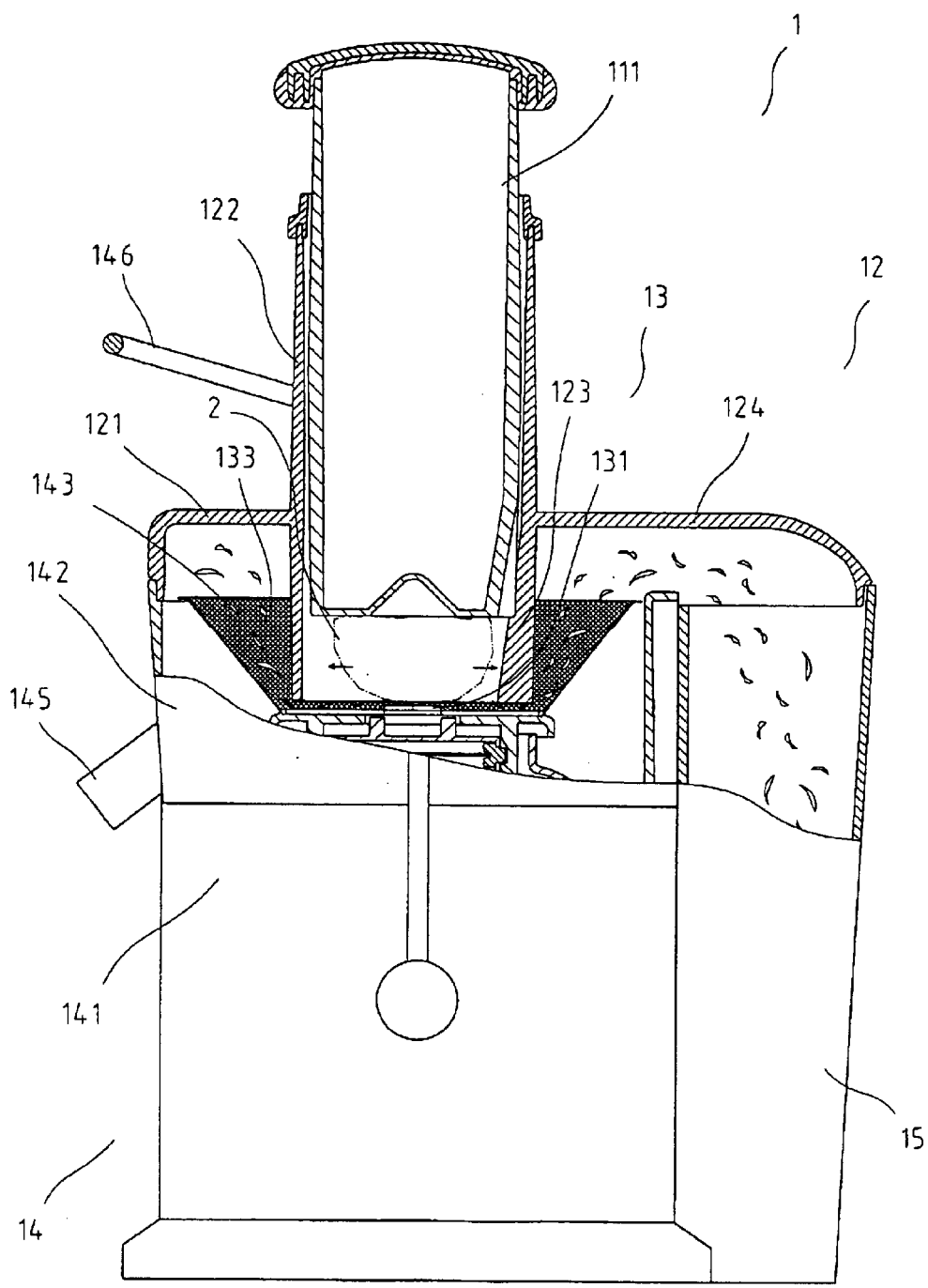
FIG. 3 is a schematic view showing the application of a conventional vegetable and fruit processor.
Figure 4:
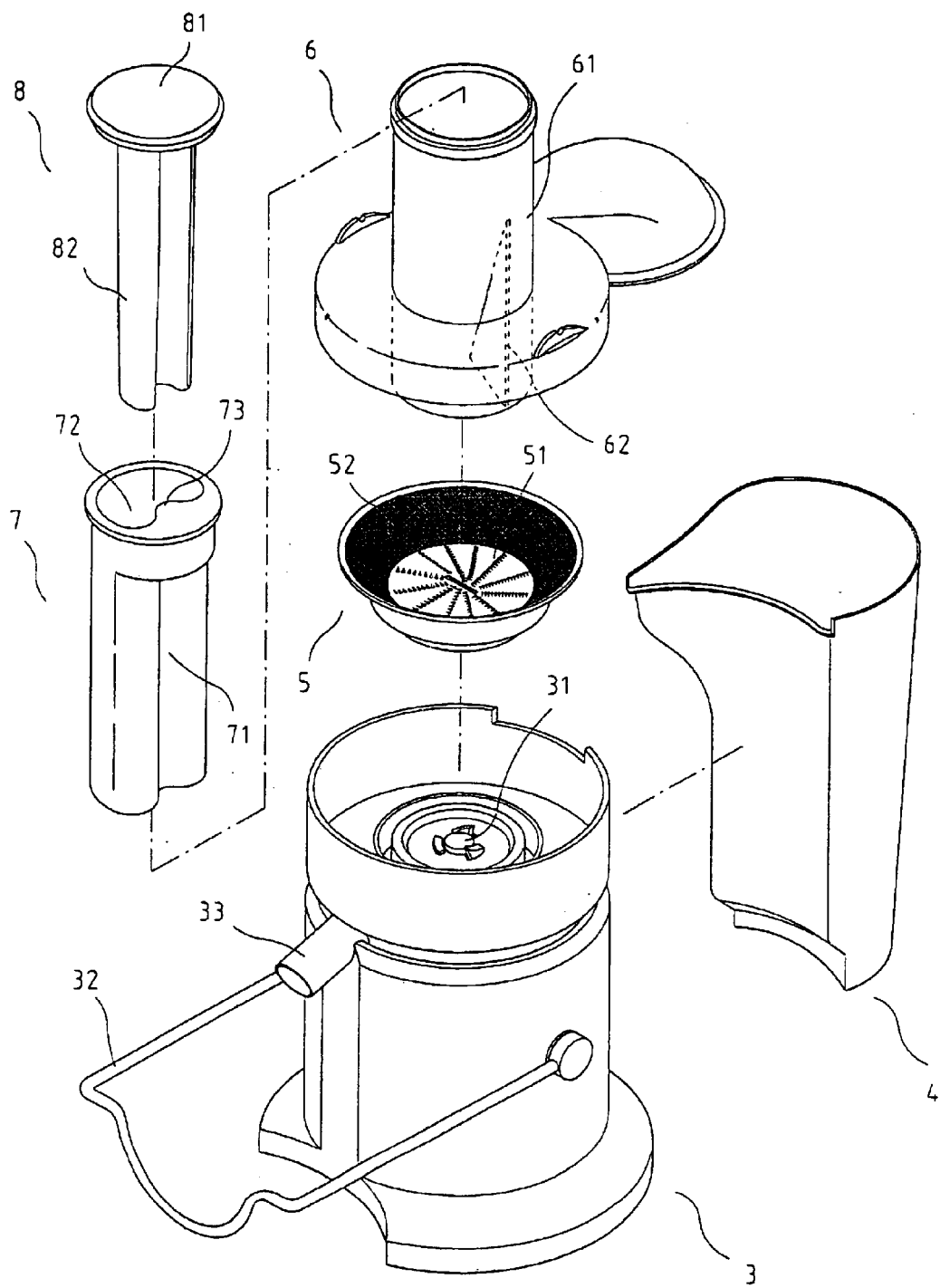
FIG. 4 is a perspective exploded view of a preferred embodiment in accordance with the present invention.

Referring to FIG. 4, there is shown a basic structure of a vegetable and fruit processor having a machine body 3 with one lateral side mounted with a residue container 4. The top portion of the machine body 3 is mounted with a disc blade 5 which can be driven to rotate simultaneously by the shaft seat 31 of the machine body 3 and a top cover 6 is mounted onto the top portion of the machine body 3. A positioning fastener 32 positioned on the machine body 3 is used to position the top cover 6, and a feeding cylinder 61 is positioned on the top cover 6. One side of the interior wall of the feeding cylinder 61 is an engaging body 62, where the top and the bottom portion of the engaging body 62 are triangular shape, which allows fruit or vegetables to be inserted through an opening of the feeding cylinder 61, and the disc blade 5 cuts and crushes the fruit and vegetables with the toothed blade 51 positioned to the disc blade 5. The circumferential edge of the disc blade 5 is provided with a filter 52 for filtering the crushed vegetables and fruit. The filtered juice is discharged out through the guiding tube 33 and the residue is centrifuged to the other side of the residue container 4. In accordance with the present invention, the feeding tube 7 is inserted into the feeding cylinder 61 and one lateral side of the feeding tube 7 is recessed to form an engaging slot 71. When the feeding tube 7 is inserted into the feeding tube 61, the engaging body 62 mounted at the feeding cylinder 61 is engaged with the engaging slot 71. Thus, the feeding tube 7 is thus fastened without rotating within the feeding cylinder 62. The feeding tube 7 is provided with a feeding hole 72, and the circumferential edge of the feeding hole 72 is internally protruded out to form an engaging end 73 such that the feeding hole 72 is irregular shape with a smaller diameter, and the pushing component 8 has a rod body 82 positioned at the lower side of the end head 81. The rod body 82 and the feeding hole 72 are of similar shape, and the external diameter of the rod body 82 is slightly smaller than the internal diameter of the feeding hole 72 and the rod body 82 can be extended to the feeding hole 72. At the same time, the feeding hole 72 can be of different size. In other words, the feeding tube with different size of feeding hole 72 can be fabricated for vegetables or fruit of different sizes.

Figure 5:
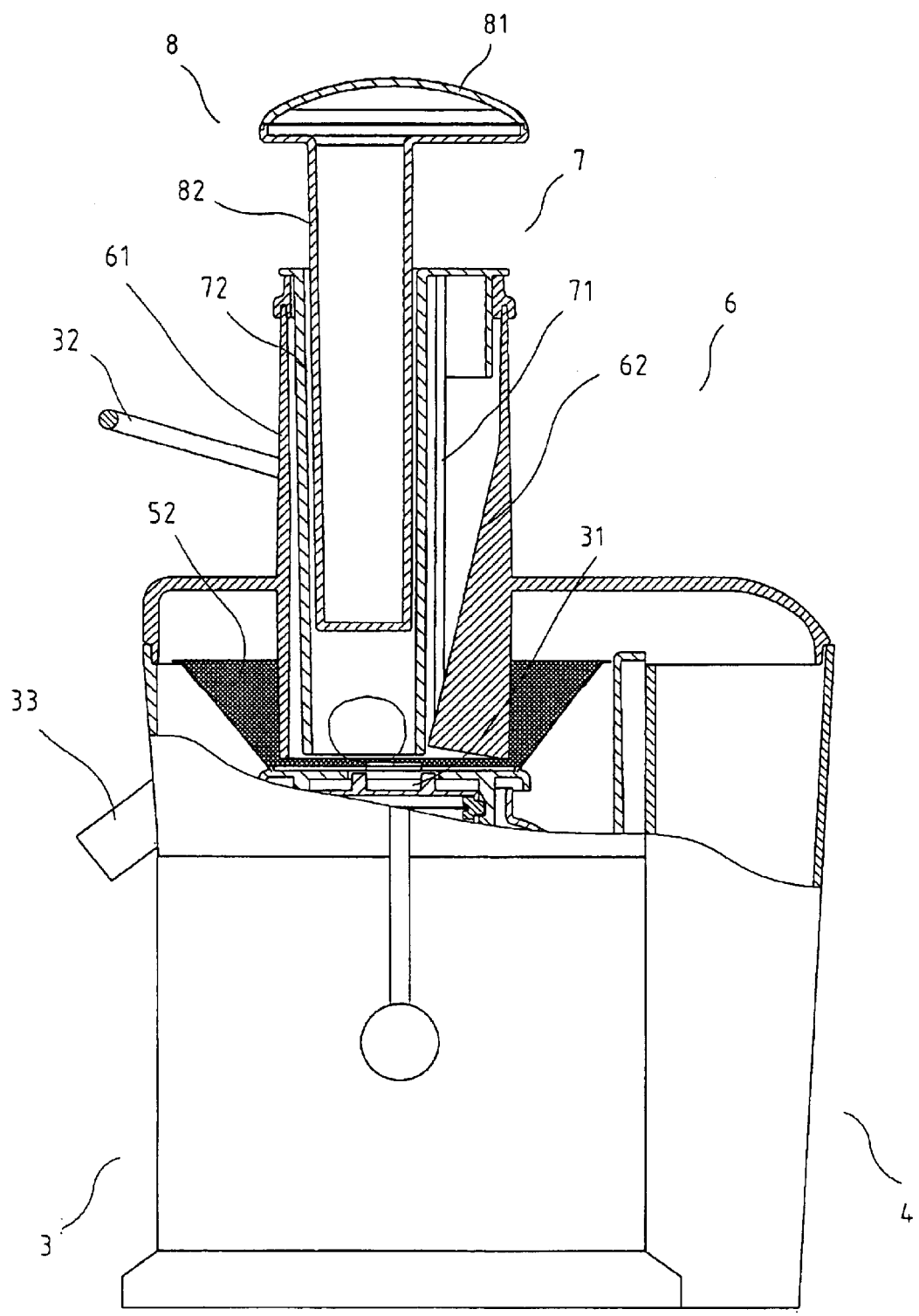
FIG. 5 is a sectional view of FIG. 4 of the present invention.
Figure 6:
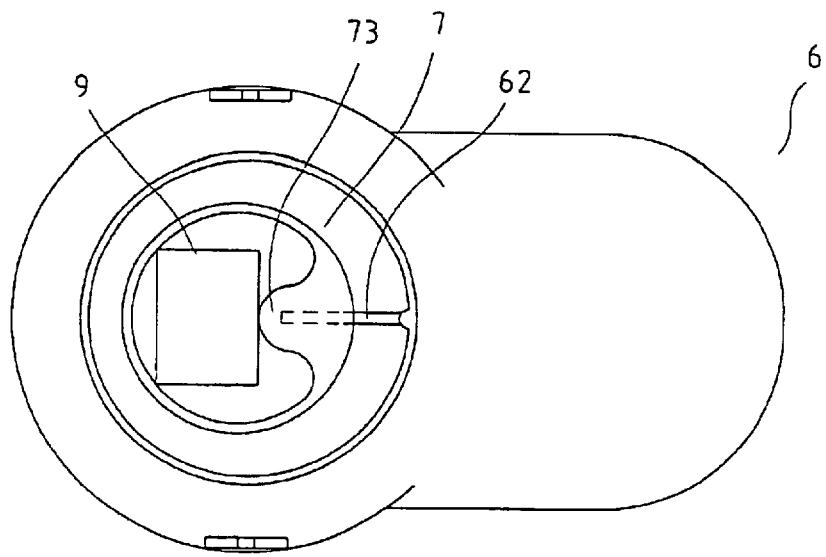
FIG. 6 is a schematic view showing the application in accordance with the present invention.
Figure 7:
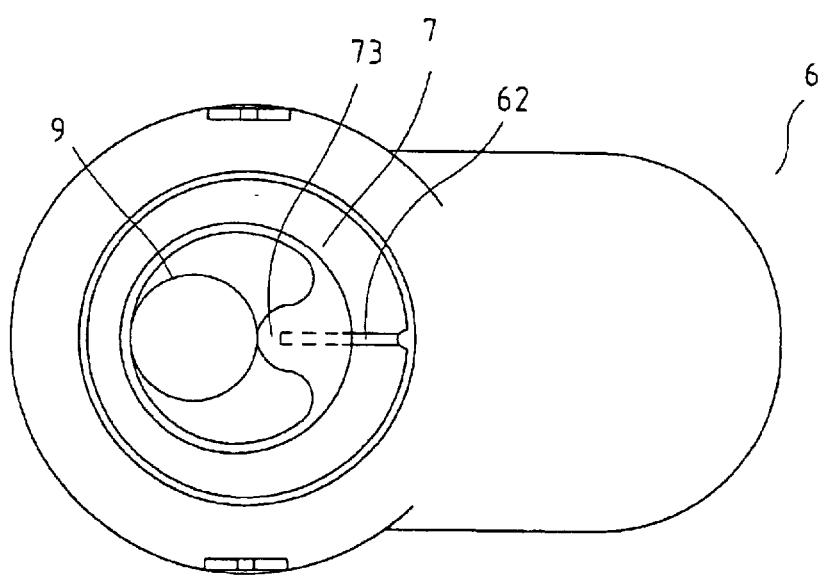
FIG. 7 is a schematic view showing another application in accordance with the present invention.

Referring to FIG. 5, in application, depending on the sizes of the vegetables and fruit 9, an appropriate feeding hole 72 is chosen and the size is equivalent to the feeding tube 7 mounted to the feeding cylinder 61. When a power switch is ON, the disc blade 5 rotates and the vegetables and fruit 9 are inserted into the feeding hole 72 of the feeding tube 7. The circumferential edge of the feeding hole 72 is protruded with an engaging end 73 and the external diameter of the fruit and vegetables are equivalent to the feeding hole 72 of smaller diameter. Thus, whether strip-like fruit and vegetables or small diameter vegetables or fruit, as shown in FIGS. 6 and 7, the engaging end 73 restricts fruit and vegetables 9 so that they will not be driven by the bottom side of the toothed blade 51. Accordingly, fruit and vegetables are cut and crushed to produce juice. With a number of selections for feeding tube 7 with different feeding holes 72, the appropriate size of vegetables and juice can be used by selecting appropriate feeding tube 7 to be mounted to the feeding cylinder 61. If the feeding tube 7 is small, the cost of production is low. The insertion of the feeding tube 7 to the feeding cylinder 61 requires an insertion and withdrawing action.

Figure 8:
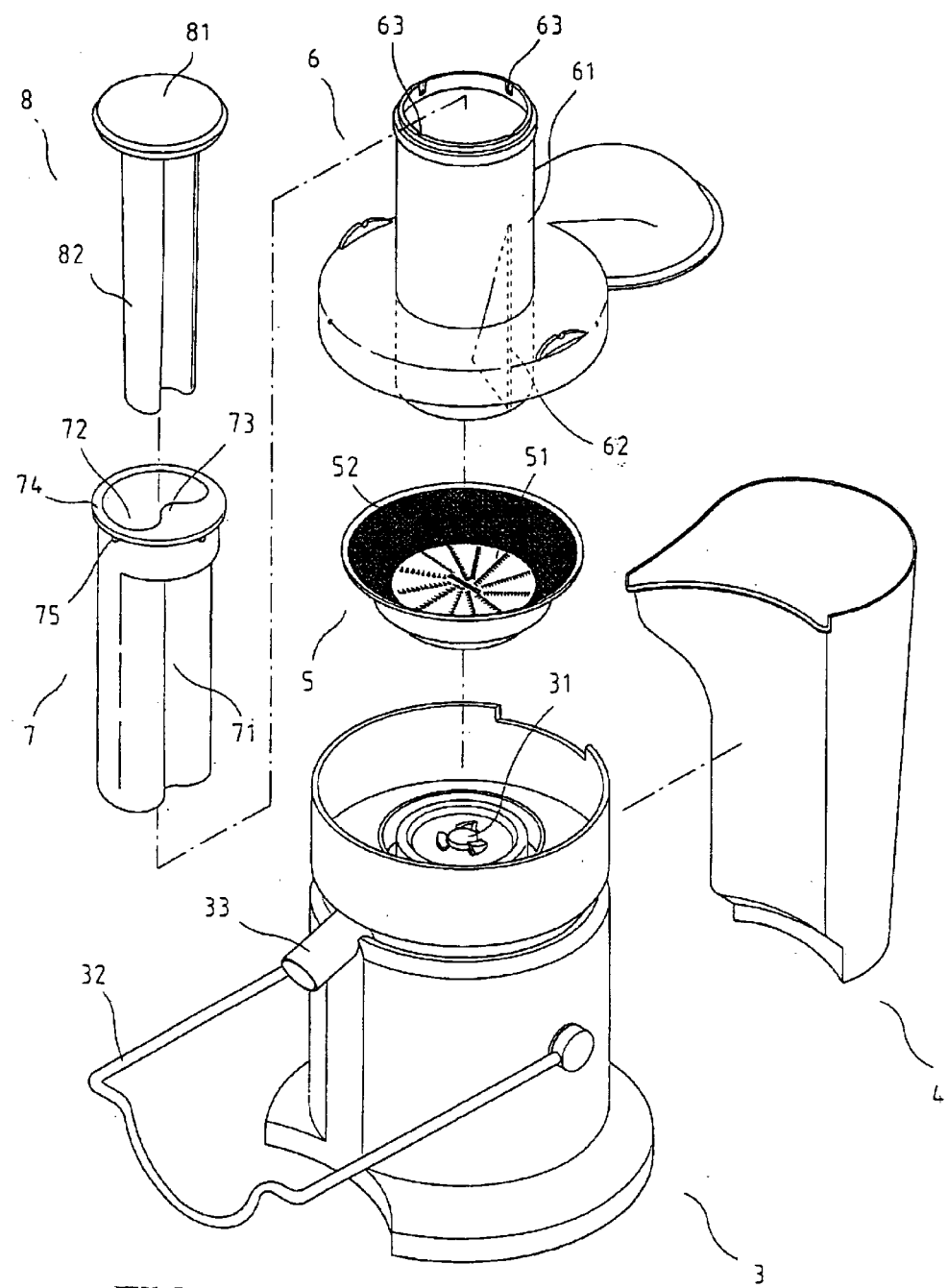
FIG. 8 is a perspective exploded view of the feeding tube and the feeding cylinder in accordance with another preferred embodiment of the present invention.
Figure 9:
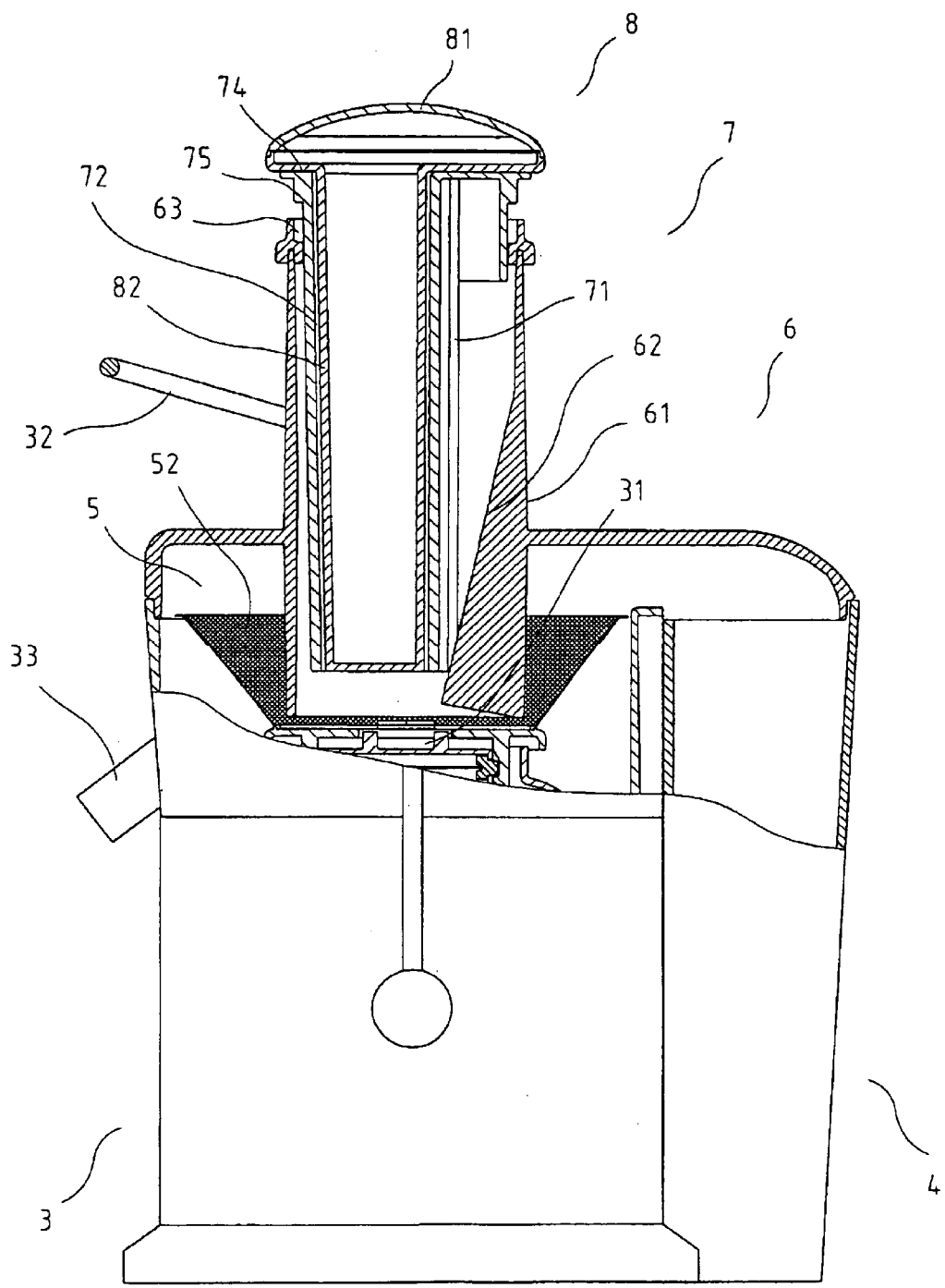
FIG. 9 is a sectional view of FIG. 8 of the present invention.

Referring to FIGS. 8 and 9, in order to improve the stability of mounting of the feeding tube 7 and the feeding cylinder 61 so that the feeding tube 7 will not rotate. The lateral face of the circular body 74 at the end face of the feeding tube 7 is extended with at least one protruded engaging block 75. At the same time, the internal wall of the top side of the feeding tube 61 is provided with corresponding engaging slot 63. When the feeding tube 7 is mounted to the feeding cylinder 61, the fastening strength of the engaging block 75 with the engaging slot 63 is increased. The feeding tube 6 can be fastened to the feeding tube 61 and therefore the feeding tube 73 will not be rotated.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A vegetable and fruit processor having a machine body, a top cover, a hollow feeding cylinder and a pushing component, wherein the feeding cylinder of the top cover is mounted with a feeding tube, and the feeding tube has a feeding hole, and a circumferential of the feeding hole is protruded with an engaging end so that the feeding hole has irregular shape of smaller internal diameter and the rod body of the pressing component and the feeding hole are of same shape, a bottom side of a circular body of a side end of the feeding tube is extended to form an engaging block and an internal wall of an upper side end of the feeding cylinder is provided with a corresponding engaging slot.

* * * * *